(12) United States Patent
Wilkens et al.

(10) Patent No.: US 7,380,810 B1
(45) Date of Patent: Jun. 3, 2008

(54) VEHICLE HITCH WITH MULTI-DIRECTIONAL DAMPING

(75) Inventors: Jeff Wilkens, West Fargo, ND (US); Tim Fisher, Alexandria, MN (US)

(73) Assignee: Air Hitch Technology, LLC, Fargo, ND (US)

( * ) Notice: Subject to any disclaimer, the term of this patent is extended or adjusted under 35 U.S.C. 154(b) by 335 days.

(21) Appl. No.: 11/111,057

(22) Filed: Apr. 21, 2005

(51) Int. Cl.
*B62D 53/06* (2006.01)

(52) U.S. Cl. .................. 280/439; 280/489; 280/492

(58) Field of Classification Search ............... 280/433, 280/438.1, 439, 440, 489, 492
See application file for complete search history.

(56) References Cited

U.S. PATENT DOCUMENTS

| | | | |
|---|---|---|---|
| 3,137,515 A * | 6/1964 | Masser | 280/440 |
| 3,580,609 A * | 5/1971 | Paielli | 280/407.1 |
| 3,827,723 A * | 8/1974 | Neff et al. | 280/476.1 |
| 4,566,716 A * | 1/1986 | Modat | 280/439 |
| 4,580,806 A * | 4/1986 | Kolstad et al. | 280/407 |
| 5,226,675 A * | 7/1993 | Noah et al. | 280/439 |
| 6,116,631 A | 9/2000 | Logan et al. | 280/483 |
| 6,170,849 B1 | 1/2001 | McCall | 280/433 |
| 6,581,951 B2 * | 6/2003 | Lange | 280/440 |
| 6,746,037 B1 | 6/2004 | Kaplenski et al. | 280/484 |
| 6,957,823 B1 * | 10/2005 | Allen | 280/439 |

* cited by examiner

*Primary Examiner*—Kevin Hurley
(74) *Attorney, Agent, or Firm*—Marsh Fischmann & Breyfogle LLP

(57) ABSTRACT

The present invention is directed to an adjustable trailer hitch that provides a suspended connection between a tow vehicle and an attached trailer. The hitch includes a support member that is adapted to be attached to a tow vehicle and a frame having first and second pivots for pivotally support a hitch plate, which is operative to connect to a trailer (e.g., engage a trailer pin). A first air spring has a first end fixedly connected to the support member and a second end fixedly connected to the frame. The air spring permits relative movement between the support member and the frame as well as transmitting towing forces therebetween. The air spring provides a pliable connection that at least partially mechanically isolates the trailer and the vehicle from each other. Instead of acting as a single unit, the vehicle and the trailer act at least partially independently of each other.

20 Claims, 6 Drawing Sheets

VEHICLE HITCH WITH MULTI-DIRECTIONAL DAMPING

FIELD OF THE INVENTION

The present invention relates to trailer hitches for attaching trailers to motor vehicles such as pick-up trucks and tractor-trailers. More particularly, the present invention relates to a trailer hitch with a slidably connected support and frame, wherein a multi-directional dampening system is operably connected between the support and frame.

BACKGROUND

Trailers can be connected to tow vehicles by any of a variety of hitches, ranging from simple ball hitches and receiver hitches to heavy-duty gooseneck and fifth wheel hitches. The selection of hitch for any particular application depends on a number of factors, including the type of vehicle, the dimensions and weight of the trailer, and the anticipated load (including the weight, dimensions, and type of load). Hitches are available for virtually any motor vehicle on the market today: ball type hitches and receiver hitches are more commonly used with passenger vehicles and light trucks (automobiles, pick-up trucks, and sport-utility vehicles) for light-duty hauling. Gooseneck and fifth wheel type hitches are typically used with heavy-duty pickup trucks and tractor-trailers for hauling heavier loads.

While in motion, all vehicles and all trailers tend to bounce or sway to some degree; the extent of such bouncing or swaying motion depends on the vehicle's speed and road conditions. When a trailer is attached to a tow vehicle by a standard lock-down or solid connection hitch, the trailer cannot move independently of the vehicle. As a result, any bouncing, swaying, and vibration of the trailer is transferred directly to the vehicle through the hitch, leading at best to an uncomfortable ride for the driver and passengers. Movement of the trailer relative to the vehicle may result in the application of forces to the vehicle in one or all of the vertical direction, the horizontal direction and/or about a longitudinal axis (e.g., a torque/moment) defined by the direction of travel of the vehicle and trailer. The safety of the driver and passengers is compromised whenever the forces exerted by the relative movement of the trailer makes it more difficult to control the vehicle, for example, if the driver encounters high bumps, dips, railroad tracks, elevation changes, expansion joints, and situations that require emergency braking (which can cause jack-knifing) or other avoidance maneuvers. As the trailer bobs, bounces, and weaves, the rear end of the vehicle can sometimes be lifted off the road; the front end of the vehicle may also be lifted in turn and pushed from side to side, creating extremely dangerous conditions.

Several attempts to alleviate the problems associated with solid connection hitches have been proposed. For instance, a number of fifth wheel hitches have been designed that include a frame having one end pivotally connected to the tow vehicle and a second end supported by one or more air bags. Typically, the fifth wheel or hitch plate is supported by the frame and is disposed between the pivotally connected end and the air bag supported end. Such arrangements allows for limited relative movement (e.g., vertical movement) between a vehicle and a fifth wheel trailer connected to the fifth wheel. However, such arrangements typically permit no side-to-side movement (horizontal movement) or torsional movement between the vehicle and the fifth wheel trailer.

SUMMARY OF THE INVENTION

The present invention is directed to an adjustable trailer hitch that provides a suspended connection between a tow vehicle and an attached trailer. The hitch includes a support member that is adapted to be attached to a tow vehicle and a frame having first and second pivots for pivotally support a hitch plate, which is operative to connect to a trailer (e.g., engage a trailer pin). A first air spring has a first end fixedly connected to the support member and a second end fixedly connected to the frame. The air spring permits relative movement between the support member and the frame as well as transmitting towing forces therebetween. Further, the air spring, support member and frame collectively define a multi-directional dampening system that attenuates movement between the vehicle and the trailer.

In effect, the air spring provides a pliable connection that at least partially isolates the trailer and the vehicle from each other. Instead of acting as a single unit, the vehicle and the trailer act at least partially independently of each other: the bouncing, jerking, twisting and swaying motions transferred from one to the other by many conventional hitches are reduced or eliminated, resulting in better control (for the driver) and a safer and more comfortable ride (for the driver, passengers, and load).

The air spring is typically a variable-pressure or adjustable-pressure air spring. For purposes of this specification, the term "spring" refers to an elastic device that regains its original shape and/or position after being compressed or extended. The terms "air spring" and "pneumatic spring" refer to a type of spring in which the energy storage element is air (or other gas) confined in a container that includes an elastomeric bellows or diaphragm. To provide enhanced support and or dampening, the hitch may incorporate two or more-air springs. In such an arrangement, the internal pressure of the multiple spring may be the same, or, the pressure may be individually adjusted.

The air spring(s) may be mounted in any fashion that allows for supporting the frame relative to the support member. In one arrangement, the air spring(s) is mounted between the first and second pivots of the frame. These pivots define a pivot axis for the attached hitch plate. By locating the air spring between the first and second pivots, the relative movement between the trailer and the tow vehicle may act more directly on the air spring and the air spring may more effectively dampen the movement. In a further arrangement, the air spring is located in a vertical plane that includes the pivot axis. In this arrangement, vertical force between a tow vehicle and the trailer may act directly on the air spring for enhanced attenuation. In a further arrangement, first and second air springs are located between the first and second pivots. Preferably, these air springs are located on opposite sides of a longitudinal axis of the vehicle and trailer (e.g., as defined by a straight forward direction of travel of the vehicle). In this arrangement, the first and second air springs may effectively permit and attenuate torsional movement (i.e., twisting movement) between the trailer and the tow vehicle. For instance, torsional movement between the vehicle and trailer of at least about 3° and more preferably at least about 12° may be permitted and/or attenuated.

In one arrangement, the air spring forms the only direct mechanical connection between the support member and that frame. In this regard, the frame may be compliantly supported by the air spring free of other direct mechanical interconnection. However, other interfaces (e.g., movable)

may be utilized to transmit forces between the support member and the frame for towing purposes.

The support member may include any structure that is operative to be fixedly attached to a tow vehicle while providing a surface for attaching a portion of an air spring(s) thereto. For instance, the support member may be formed as a plate that is directly attachable to a tow vehicle. Alternatively, the support member may attached to a tow vehicle using an intermediate member (e.g., legs, towers etc.). In this regard, the height of the hitch assembly relative to a tow vehicle may be adjusted. Likewise, the frame may include any structure to which a second portion of an air spring may be connected and which is operative to support a hitch plate.

As noted, the hitch may further include a second interface that is operative to transmit forces between the support member and the frame. Preferably, this second interface may be operative to transfer towing forces between a vehicle and an attached trailer while still permitting relative movement therebetween.

In one arrangement, the second interface comprises a track member interconnectable to one of the frame and the support member and a slide member is interconnectable to the other of the frame and support member. The track member and the mating slide member are adapted to move relative to one another in at least a first direction and transfer forces therebetween in at least a second direction. Generally, the track member is sized to permit the slide member to move between first and second positions relative to the track member.

The track member may be integrally formed within the support member and/or the frame (e.g., a slot passing through a wall of said member). Alternatively, the track member may be separate member (e.g., a channel-like member) that is interconnected to a surface of the frame or support member. In any case, the track member may be positioned such that it receives the slide member and permits the slide member to move between the first and second positions.

The slide member may be any member that is operative to move relative to (e.g., within) the track member. A non-inclusive list includes a slide block, a wheel, a pin, a bar, a cam or a bearing. In one particular arrangement, first and second track members and first and second slide members form the second interface. The first track member and first slide member may be disposed in an opposing relationship with the second track member and the second slide member. In any case, it may be preferable that the elements of the second interface be removable such that they may be replaced e.g., due to wear).

The combined action of the air spring, and the second interface (e.g., track and slide assembly) substantially reduces transmission through the trailer hitch of any relative movement of the trailer and the vehicle, thereby improving driver control as well as providing increased comfort and safety. When driving over bumps, potholes, railroad tracks, and the like, up-and-down, side-to-side movement of the trailer and the vehicle is substantially absorbed by the trailer hitch while continuing to move and turn as a single unit under the driver's control, relative movement of the trailer with respect to the vehicle is no longer transferred to the vehicle (and vice versa).

The combination formed by the track member and slide member constitutes another feature of the present invention. The track member is configured to receive the slide member (e.g., slide block or wheel), which is configured and positioned to mate with the track member when the trailer hitch is assembled. The track member is preferably made of a sturdy, durable material such as stainless steel, aluminum, nylon, polymers or the like, and forms a channel that slidingly receives slide member, and preferably substantially enclose the slide member when the trailer hitch is assembled for use. If desired, wear strips may be installed in the track member to help extend the working life of the trailer hitch. The optimum configuration of the slide member depends on the particular application. For example, a slide block assembly may include one or more low-friction slide blocks to one of the support member and/or frame. On one arrangement, a pair of low-friction slide blocks mounted in an opposing relationship corresponding with a pair of tracks mounted in a corresponding opposing relationship. The slide block(s) and/or the wheels may be made of any suitable low friction material (such as ACETAL, NYLATRON, NYLON, TEFLON, or other suitable material); alternatively, the components may be made of a metal core with a low-friction coating.

Still another feature of the present invention is the air spring, which connects the support member and the frame to help dampen transmission of movement from the trailer to the vehicle (or vice versa) and furthers adjustment of the trailer hitch for different loads. In one arrangement, the air spring is an adjustable-pressure, single or double bellows type air (i.e., pneumatic) spring of the type sometimes referred to as an "air bag," "air spring," or the like (for purposes of this specification, the terms "air spring," "air bag," and "pneumatic spring" are used interchangeably). The air spring can be a manually inflatable or automatically inflatable type; these types of air springs can readily be inflated with a portable compressor, with an air hose (at service stations or other facilities), or with an on-board compressor and control system accessible to the driver of the tow vehicle.

Changing the pressure in the air spring helps adjust the trailer hitch for different types and weights of load. (While hydraulic or mechanical springs may also be useful, air springs are preferred because of their adjustable pressure.) If multiple air springs are utilized, the pressure of each spring may be individually adjusted to change the pitch of the frame. In this regard, a user may interconnect a trailer to a tow vehicle and adjust a pressure of at least a first air spring that is disposed at a first distance from a longitudinal axis of the vehicle and trailer to adjust a tilt of the trailer.

DETAILED DESCRIPTION

Figure 1:
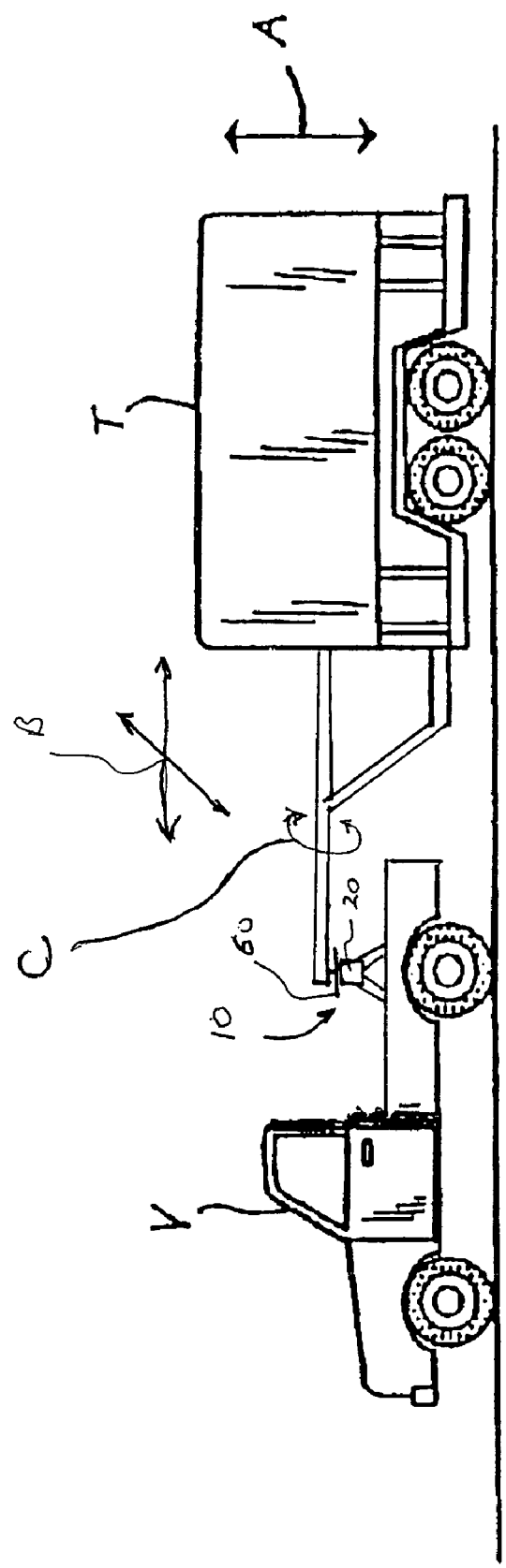
FIG. 1 is a side view showing a trailer connected to a tow vehicle by a hitch in accordance with the present invention.

The present invention is directed to a compact, simple and sturdy trailer hitch that allows relative movement between a tow vehicle and an attached trailer in at least the vertical and horizontal directions as well as about at least one torsional axis. The invention is applicable to a variety of trailer hitch assemblies, however, in the following description, the invention is set forth in the context of a fifth wheel trailer hitch. It will be appreciated, however, that certain aspects of the invention are not limited to such applications. Further, in the following detailed description of the invention, reference numerals are used to identify structural elements, portions of elements, surfaces or areas in the drawings, as such elements, portions, surfaces or areas may be further described or explained by the entire written specification. For consistency, whenever the same numeral is used in different drawings, it indicates the same element, portion, surface or area as when first used.

FIG. 1 illustrates a tow vehicle v that is interconnected to a trailer t using a fifth wheel hitch 10. As shown, the fifth wheel hitch includes a damping assembly 20 that permits relative movement between the tow vehicle in vertical, horizontal, front-to-back and torsional directions. Further, the damping assembly is adapted to attenuate the relative movement between the vehicle and the trailer t. As used herein, the terms "horizontal," "vertical," "left," "right," "up," "down," as well as adjectival and adverbial derivatives thereof, refer to the relative orientation of the illustrated structure as the particular drawing figure faces the reader.

Figure 2:
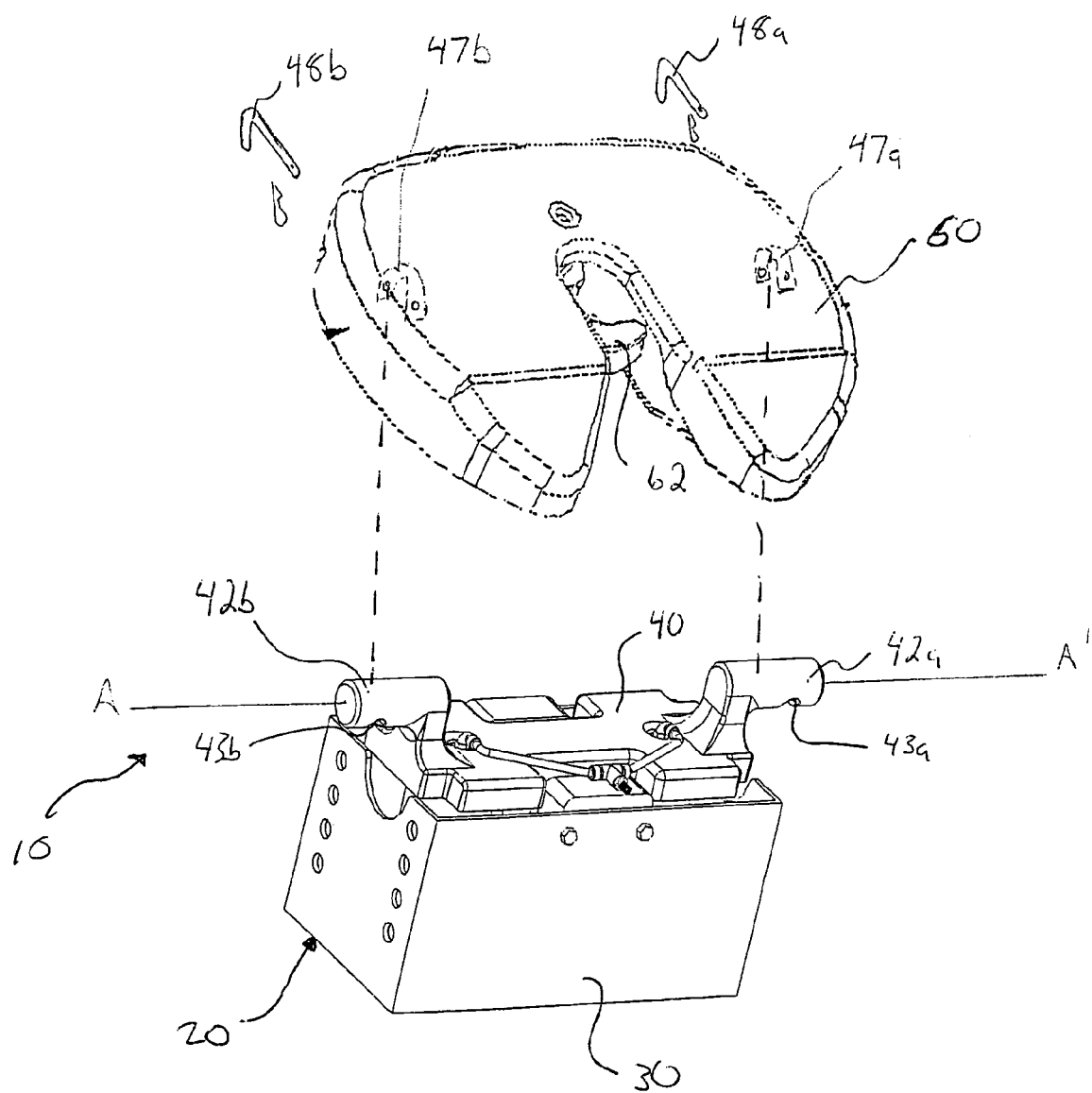
FIG. 2 is a partially exploded, perspective view of a portion of a trailer hitch.

Referring now to FIG. 2, there is shown a partially exploded perspective view of one embodiment of a fifth wheel hitch assembly 10 (hereafter hitch 10). The hitch assembly 10 contains two main components: the hitch plate 60 (also known as an anvil) and a dampening assembly 20. As shown, the hitch plate 60 is adapted to receive a pin (not sown) on a fifth wheel trailer to interconnect the trailer to the tow vehicle. To secure the trailer to the hitch plate 60, the hitch plate 60 includes a latch 62 that moves to a lock position (as shown) when a trailer pin is engaged therein. The hitch plate is pivotally interconnected to a frame 40 that is pliably supported within the dampening assembly 20, as will be more fully discussed herein. Particularly, first and second devises 47a, 47b on the bottom of the hitch plate 60 fit over and connect to first and second pivots 42a and 42b of the frame 40 of the dampening assembly 20. Pins 48a, 48b extend through the devises 47a, 48b and through receiving notches 43a, 43b on the pivots 42a, 42b. However, it will be appreciated that other methods for pivotally attaching the hitch plate 60 to the frame 40 may be utilized and are considered within the scope of the invention.

The pivotal connection allows the hitch plate 60 to partially rotate about a pivot axis A-A' defined by the first and second pivots 42a 42b. Generally, when the hitch assembly 10 is interconnected to a vehicle v, the pivot axis A-A' as defined by the first and second pivots 42a 42b is substantially perpendicular to the longitudinal axis of the vehicle v and trailer t. That is, the axis A-A' is substantially perpendicular to the direction of travel of the vehicle. Such pivotal interconnection about the pivot axis A-A' permits relative motion (e.g., a first degree of freedom) between the vehicle v and the trailer t about this axis.

The dampening assembly 20 allows for additional degrees of freedom between the vehicle v and the trailer t. Specifically, the dampening assembly 20 permits relative movement between the vehicle v and trailer t in a vertical direction as indicated by arrow A in FIG. 1 as well as limited movement in horizontal directions (i.e., from-to-back and side-to-side) as shown by arrows B in FIG. 1. Finally, the dampening assembly 20 permits for torsional movement between the trailer t and the vehicle v about the longitudinal axis of the vehicle v and trailer t as shown by arrow C in FIG. 1. Such functionality will be more fully described herein.

Figure 3:
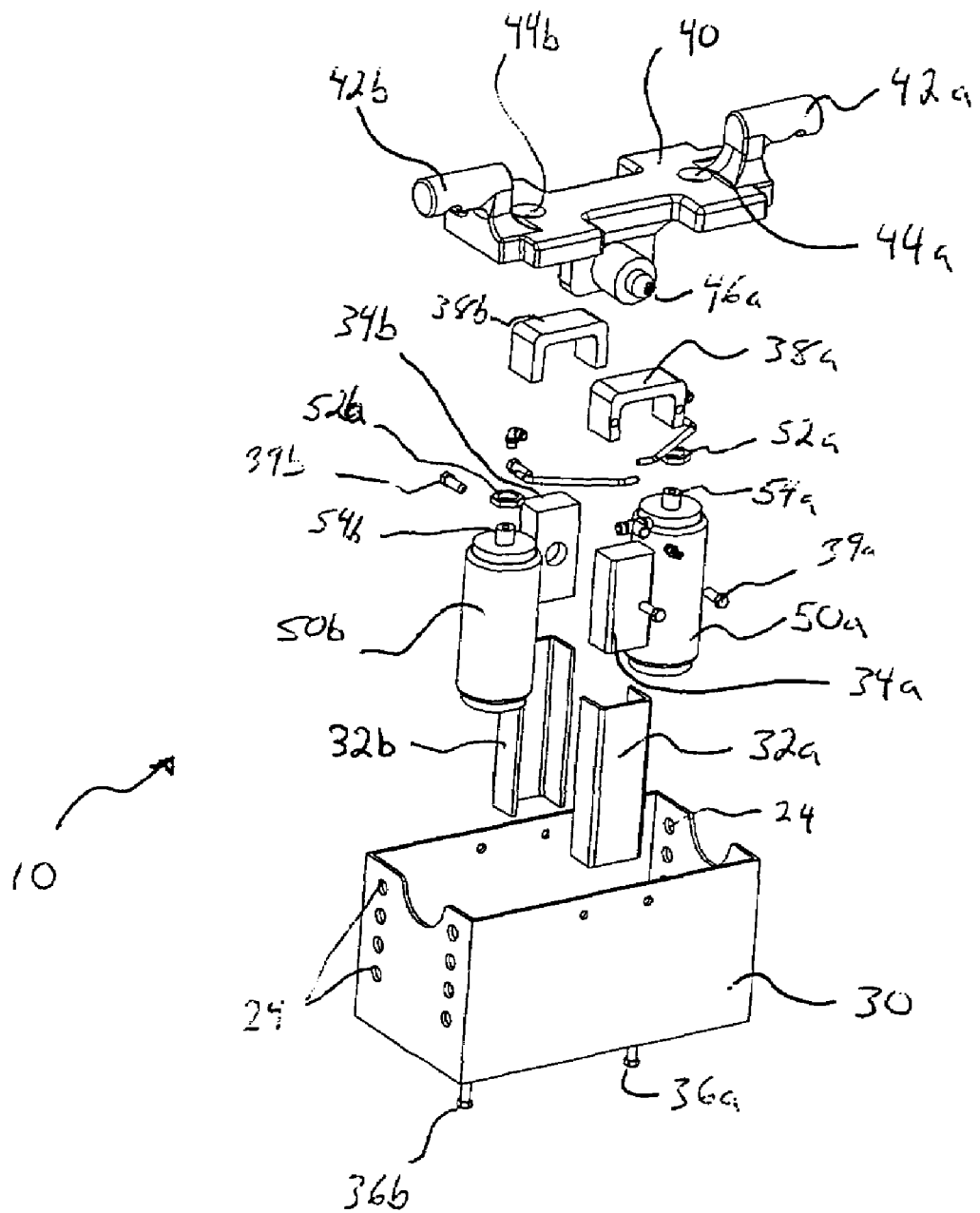
FIG. 3 is a fully exploded, perspective view of the hitch of FIG. 2.
Figure 4A:
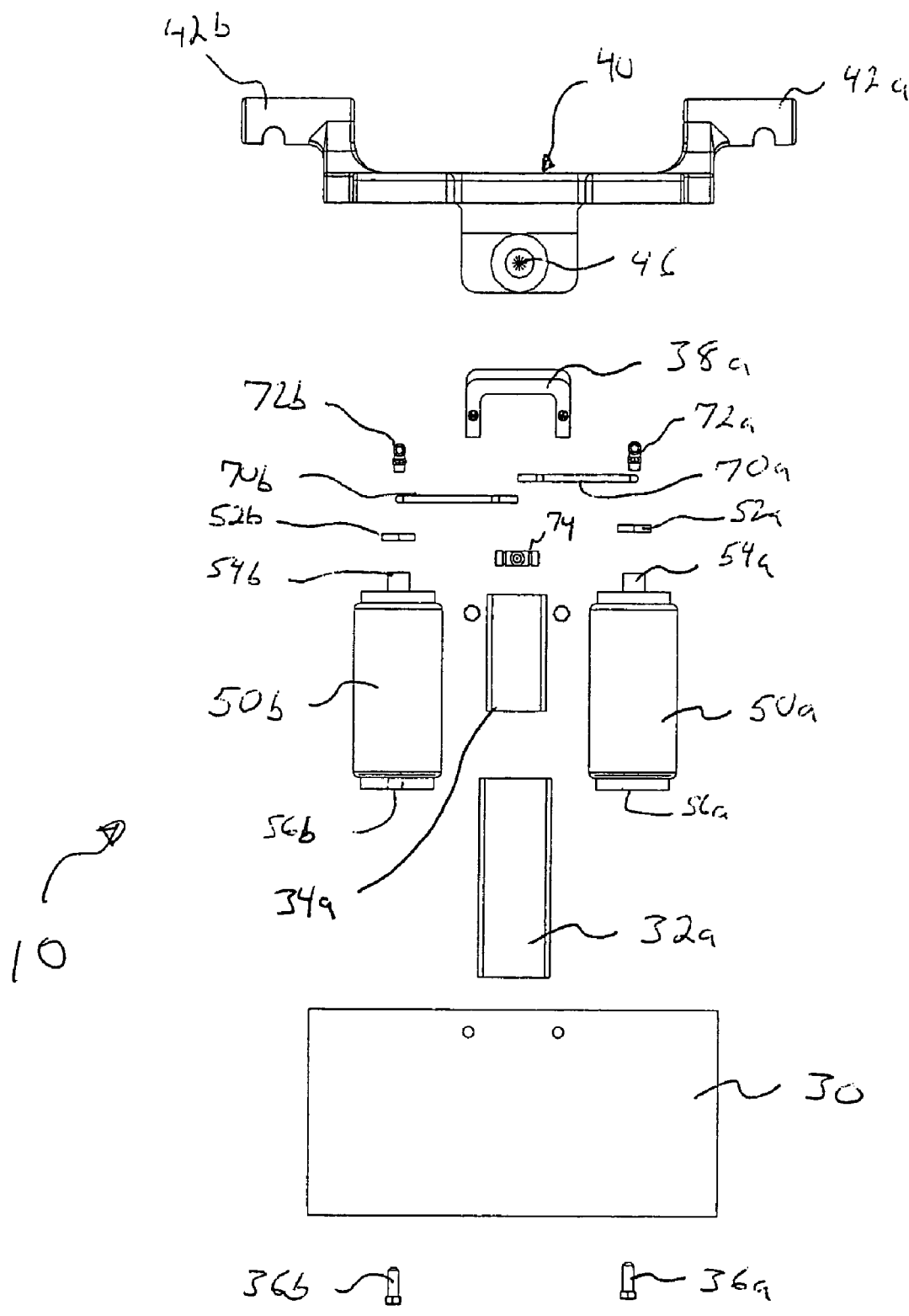
FIG. 4A is a fully exploded, side view of the hitch of FIG. 2.
Figure 4B:
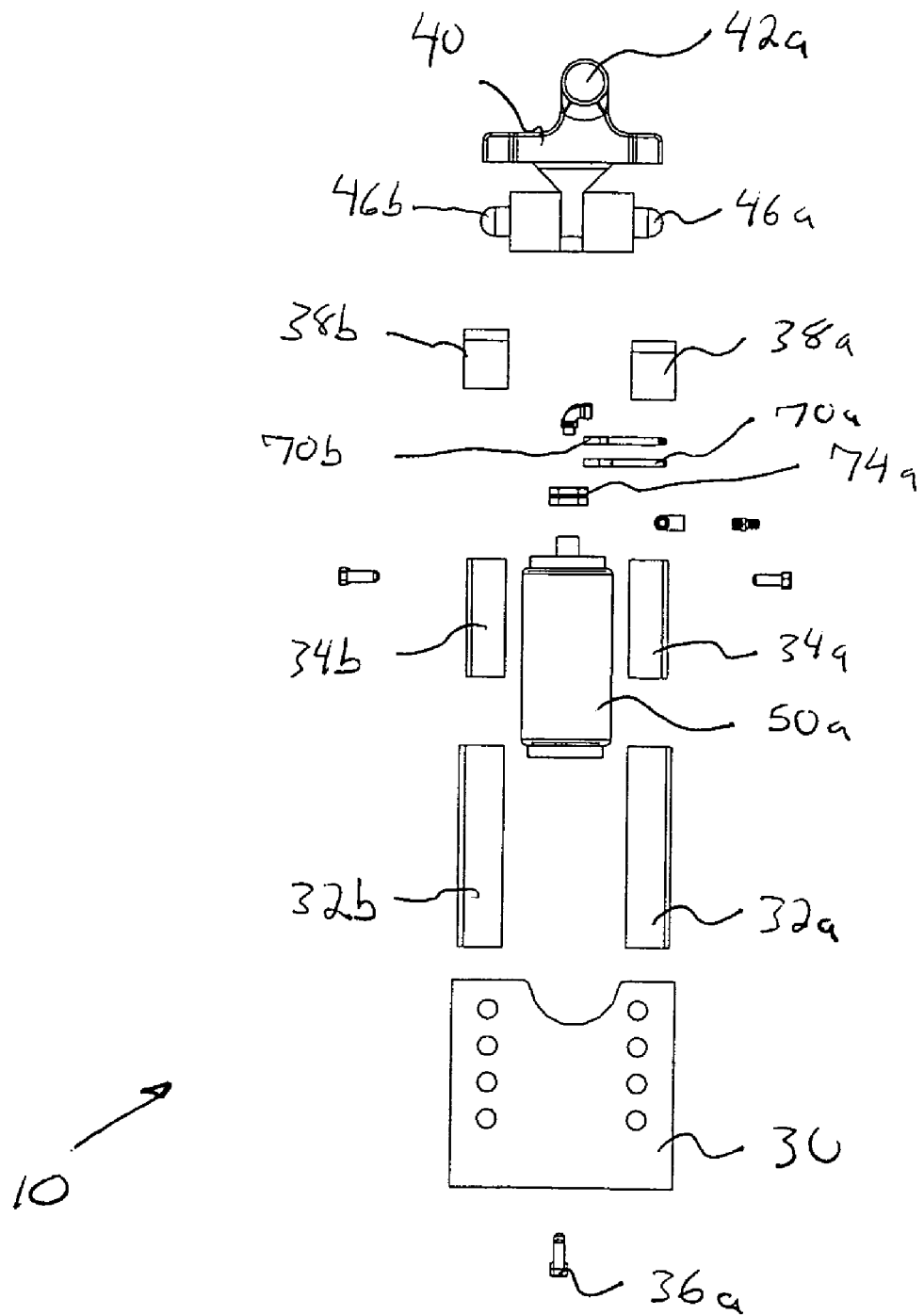
FIG. 4B is a fully exploded, end view of the hitch of FIG. 2.

FIGS. 3, 4A and 4B show perspective, side, and end exploded views of the dampening assembly 20, respectively. The dampening assembly 20 includes a support member 30, the frame 40, which pivotally supports the hitch plate 60 and first and second air springs 50a, 50b interconnecting the support member 30 and support frame 40.

The support member 30 is adapted for fixed interconnection to a tow vehicle. In the present embodiment, the support member is a box-like member having one open end. In this regard, the bottom surface of the box-like support member 30 is generally a flat horizontal mounting surface having first and second through holes (not shown) for attaching the support member 30 to the air springs 50a, 50b by any suitable type of fasteners. Additional through holes 24 on the side surfaces and/or on the bottom surface may be used to attach the support member 30 in variable heights and locations to the tow vehicle. Such attachment may include one or more intermediate members such as vertical plates/towers having a first end interconnected to the tow vehicle and a second end interconnectable to the support member 30.

The air springs 50a and 50b are pneumatic devices that can be manually inflated or automatically inflated. That is, the internal pressure of the air springs 50a, 50b may be selectively adjusted. In this regard, the air springs 50a and 50b have various air lines 70a, 70b and valves 72a, 72b. The air lines 70a, 70b and valves 72a, 72b are interconnected by a common manifold 74. This manifold may be interconnected to a source of compressed air such that first and second air springs 50a, 50b may be inflated to a common pressure. However, it will be appreciated that in other embodiments the air springs 50a and 50b may each utilize pneumatically isolated air lines 70 and valves 72. In this latter regard the internal pressure of the air springs 50a, 50b may be individually adjusted. In any case, the air springs 50a, 50b can readily be inflated with a portable compressor, or with an onboard compressor and control system accessible by the driver of the tow vehicle.

Each air spring 50a, 50b includes an upper mounting lug 54a, 54b and a lower threaded receptacle 56a, 56b. The upper mounting lugs 54a, 54b are dimensioned to fit through holes 44a, 44b within the frame 40. In this regard, the mounting lugs 54a, 54b are inserted into the holes 44a and 44b and secured thereto by suitable sized nuts 52a, 52b. The treaded receptacles 56a, 56b are secured to the bottom inside surface of the generally box-like support member 30. Specifically, first and second bolts 36a, 36b extend through the bottom surface of the support member 30 to engage the threaded receptacle 56a, 56b. The interconnection of the frame 40 to the support member 30 using the first and second air springs 50a, 50b provides a pliable connection between these members 30, 40. In this regard, the frame 40 can be considered a floating frame 40 that is not rigidly connected to the support member 30.

While the air springs 50a, 50b attach the floating frame 40 to the support member 30, it may be desirable to have additional structure therebetween for transmitting towing forces between a tow vehicle and trailer. Further, such additional structure may limit relative movement between the support frame 40 and the support member 30 in one or more dimensions. However, in order to maintain the benefits associated with the pliable coupling provided by the air springs 50a and 50b, it is preferable that any additional structure also permit some movement between the frame 40 and support member 30. In the embodiment shown in FIGS. 3 and 4, a slide block assembly is utilized to provide additional structure for transmitting towing forces while maintaining a movable interconnection between the floating frame 40 and the support structure 30.

The slide block assembly comprises first and second vertical tracks 32a, 32b that are interconnected to the inside surfaces of the box-like support structure 30. Each track 32a, 32b may be interconnected to the support structure 30 in any appropriate manner including, without limitation by welding and/or bolting. A pair of wear strips (not shown) may be attached to the interior walls of the tracks 32a, 32b to reduce wear and the effects of frictional forces during the use of the hitch 10. Such wear strips may be replaceable and may cover all or part of the interior surfaces of the tracks 32a, 32b.

The floating frame 40 supports a pair of spaced apart substantially parallel slide blocks 34a, 34b. These slide blocks 34a, 34b are pivotally interconnected to the floating frame 40. More particularly, each slide blocks 34a, 34b includes a detent on its interior surface that is sized to receive a stud 46 (only one shown) that is rigidly attached to the floating frame 40 (e.g., integrally formed with the frame 40). Upon assembly, the slide blocks 34a, 34b are configured to slide freely in the tracks 32a, 32b. However, the slide blocks of 34a, 34b may be configured to have some give when the hitch 10 is fully assembled. That is, the slide blocks 34a, 34b may exhibit a modest degree of back and forth, side to side movement within the tracks 32a, 32b that provides a measure of cushioning and flexibility during use to optimize the free relative movement between the trailer t and vehicle v. Though the slide blocks 34a, 34b and tracks 32a, 32b are shown having generally rectangular and U-shaped cross sections, respectively, other cross sectional shapes may also be utilized.

Upon assembly of the dampening assembly 20, the bottom end of each track 32a, 32b abuts against the bottom inside surface of the support member 30. As will be appreciated, this butting relationship provides a stop for the slide blocks 34a, 34b at one end of each track 32a, 32b. The top end of each track 32a, 32b utilizes a removable track cap or bump stop 38A, 38B that provides a second stop for the slide blocks 34a, 34b. As shown, these track caps 38 are generally U-shaped members that are sized to extend over the ends of the tracks 32a, 32b. Additionally, each track cap 38A, 38B includes first and second bolts 39A, 39B that allow each track cap 38A, 38B to be fixedly mounted to the support member 30 upon assembly. As will be appreciated, the use of the removable track cap 38A, 38B allows for ready disassembly of the dampening assembly 20 such that parts subject to wear, e.g., slide blocks 34a, 34b, may be periodically serviced/replaced.

When the dampening assembly 20 is utilized in a fifth wheel hitch assembly, the support member 30 and floating frame 40 are operative to move relative to one other in response to relative vertical, horizontal, and/or torsional movement. To permit vertical movement, the slide blocks 34a, 34b move up and down in the tracks 32a, 32b. Horizontal movement is permitted by clearance tolerances of the slide blocks 34a, 34b in the track 32a, 32b and/or by movement of the hitch plate 60 along pivot axis A-A'. Torsional movement, as represented by arrow D in FIG. 1, is permitted by compressing one air spring 50a or 50b when a moment is applied about the longitudinal axis of the vehicle and trailer. Such torsional movement may be caused by one wheel of the trailer becoming elevated (passing over a bump) relative to an opposing wheel.

Irrespective of the type of movement, the air springs 50a, 50b together with the slide blocks 34a, 34b in tracks 32a, 32b form a multidirectional damping system that mechanically isolates the vehicle v and trailer t from each other, thereby reducing transmission of up and down, side to side and torsional movement therebetween. Instead of acting as a single unit, vehicle v and trailer t act substantially independent of each other. Transmission of movement between the vehicle and the trailer is dampened by the action of the air springs 50a, 50b and the generally smooth movement of the slide blocks 34a, 34b in the tracks 32a, 32b. In this regard, trailer t tends to move up and down, side to side and about its own longitudinal axis instead of transmitting such movement to the tow vehicle through the trailer hitch 10. Accordingly, bouncing, jerking, swaying, twisting and vibration transfer from the trailer to the vehicle is substantially reduced or eliminated.

As noted the dampening assembly 20 reduces torsional forces applied by the trailer t to the vehicle v. In this regard, utilization of the two air springs 50a, 50b disposed near the longitudinal axis of the tow vehicle and trailer allows for substantial dampening of such torsional forces. More importantly, the air springs 50a, 50b are mounted beneath the pivot axis A-A' of the hitch plate 60 and are disposed between the ends of the pivots 42a, 42b of the floating frame 40. This orientation places the air springs 50a, 50b near the longitudinal axis defined by the vehicle v and trailer t. In this regard each air spring 50a and 50b has a short moment arm to the longitudinal axis. This short moment arm reduces the moment force required to press/deflect the air springs 50a, 50b. In this regard, even small torsional movements of the trailer may be dampened. In contrast, if the air springs were placed further away from the longitudinal axis of the vehicle v and trailer t, such small torsional forces may not deflect the air springs 50a, 50b and would be transmitted from the trailer t to the vehicle v. Further, the use of the floating frame 40 and the dual air springs 50a, 50b allows for large deflections about the longitudinal axis (i.e., tilting of the pivot axis A-A'). For instance, the hitch plate 60 may be pivotally mounted to the frame 40 to permit minimal tilting movement. Use of the air springs 50a, 50b may permit additional deflection/tilt of the pivot axis. Such deflection may be at least about 3° and more preferably at least about 12° degrees relative to a static position (i.e., a non-deflected position where torsional forces are not present). Further, each air spring 50a, 50b may utilize separate air lines 72 such that the pressure of each air spring 50a, 50b may be individually adjusted. Such individual adjustment may allow for adjusting the angle of the floating frame 40 such that the hitch assembly 10 may be leveled relative a trailer for towing purposes.

A further benefit is provided by locating the air springs 50a, 50b at least partially beneath the pivot axis A-A'. See FIG. 4B. That is, it may be preferred to locate the air springs 50a, 50b at least partially in a vertical reference plane that passes through the pivot axis. As will be appreciated, the hitch plate 60 is generally designed to receive and hold a pin form a trailer along this pivot axis A-A'. Accordingly, any vertical relative movement between the trailer and the tow vehicle may directed through the vertical reference plane. By placing the air springs 50a, 50b in this plane, enhanced damping of the relative vertical movement may be achieved.

Figure 5:
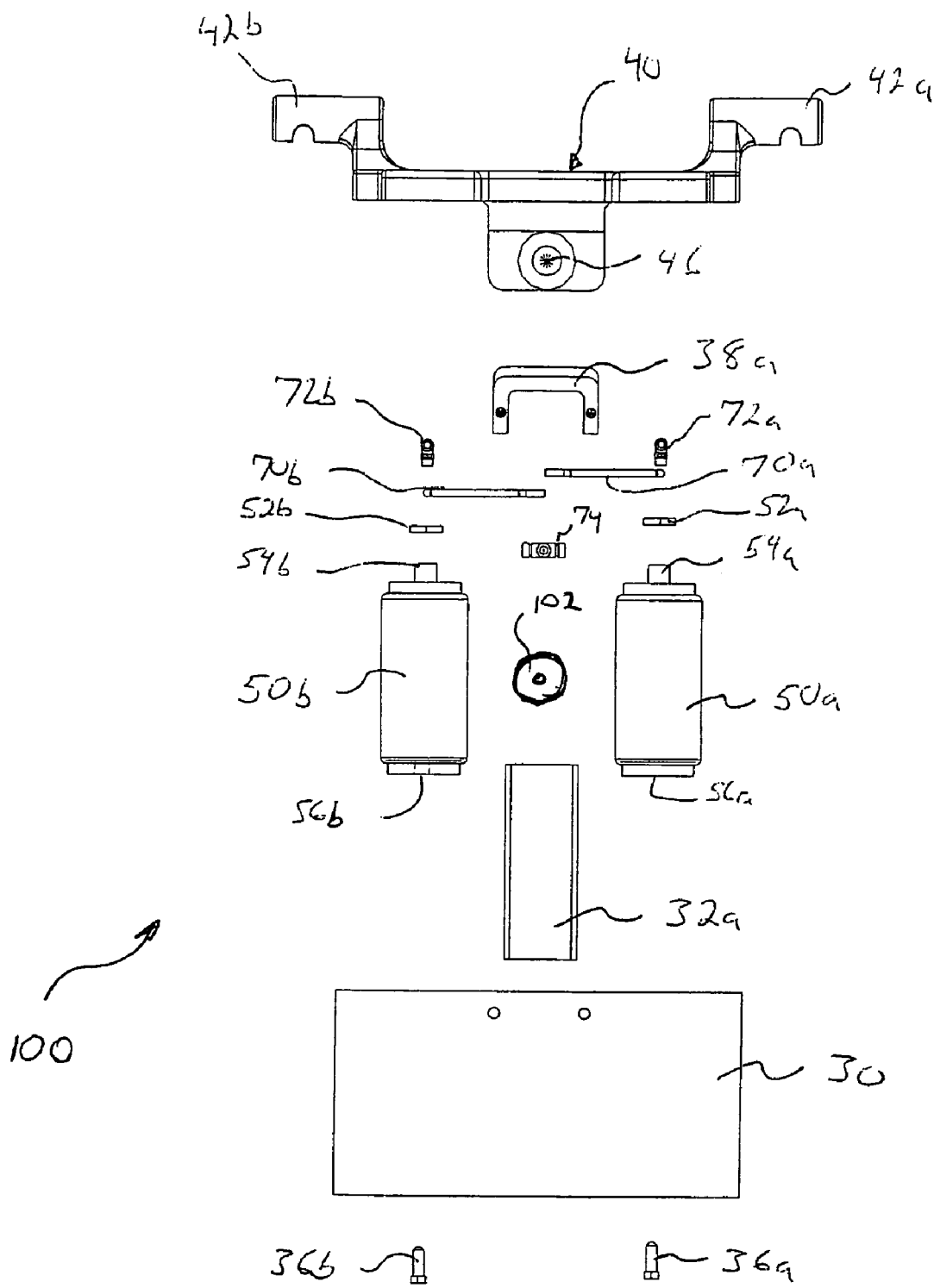
FIG. 5 is a fully exploded, side view of a second embodiment of the hitch of FIG. 2.

Though discussed above as utilizing a slide block assembly to transmit towing forces between the floating frame 40 and the support member 30 while permitting relative movement therebetween, it will be appreciated that further embodiments of the dampening assembly 20 may utilize other assemblies to transmit towing forces. For instance, FIG. 5 illustrates a hitch 100 that is substantially identical to the hitch 10 of FIGS. 2-4 except that instead of using slide blocks, the hitch 100 utilizes wheels 102 that are connected to the studs 46 on the frame 40. Accordingly, the wheels 102 are sized to fit within the tracks 32 and provide substantially the same function as the slide blocks.

While driving a vehicle that is connected to a trailer by fifth wheel hitch 10 or 100, less road-dependent movement of the trailer is transmitted to the vehicle due to the multi-directional dampening action provided by the hitch. Instead of acting as a single unit, the vehicle and the trailer act substantially independently of each other, resulting in better control by the driver and a safer, more comfortable ride.

Once installed, the hitch 10, 100 can readily be adjusted for different types and weights of load simply by adjusting the pressure in the air springs 50a, 50b. If the air springs 50a, 50b lose pressure for any reason, the hitch 10, 100 functions as a conventional lock-down or solid hitch until the user can effect any needed maintenance or repairs.

It will be understood by those of ordinary skill in the art that the materials, dimensions, weight, and selection of components for above-described trailer hitches depend on the particular application and anticipated load-bearing capacity of the hitches. All hitch components are preferably made of sturdy, durable materials, including but not limited to stainless steel, steel, aluminum, iron, nylon and polymers. Metal components of hitches 10, 100, may be machined of standard stock and welded or otherwise fastened together; alternatively, some or all of these components may be cast, poured or injected by suitable techniques known in the art of metal-working. By way of example, tracks 32a, 32b may be made of heavy-duty stainless steel. Slide blocks 34a, 34b and, if utilized, any wear strips interconnected to the interior surfaces of the tracks 32a, 32b, in their various embodiments are preferably made of low-friction plastics such as NYLATRON, NYOIL, ACETAL, TEFLON and the like (however, laminate and composite materials may also be utilized).

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed is:

1. A hitch assembly for connecting a tow vehicle to a trailer, comprising:
   a support member for fixed interconnection to a tow vehicle;
   a frame having first and second pivots for pivotally supporting a hitch plate that is adapted to connect a trailer to a tow vehicle, wherein said first and second pivots define a horizontal pivot axis, and wherein said horizontal pivot axis is transverse to a longitudinal axis of the tow vehicle;
   a first air spring having a first end fixedly connected to said support member and a second end fixedly connected to said frame, wherein said first air spring supports said frame relative to said support member free of other direct mechanical connection between said frame and said support member; and
   a sliding interface between mating contact surfaces of said frame and said support member wherein said sliding interface permits vertical relative movement between said support member and said frame and at least partially restricts movement in a second direction to transit tow forces between said frame and said support member.

2. The hitch assembly of claim 1, wherein said second end of said first air spring is fixedly connected to said frame at a location between said first and second pivots.

3. The hitch assembly of claim 1, wherein in a static configuration at least a portion of said first air spring is disposed in a vertical plane that extends through said pivot axis.

4. The hitch assembly of claim 1, wherein an internal pressure of said first air spring is selectively adjustable.

5. The hitch assembly of claim 1, wherein said sliding interface comprises:
   a track member attached to one of said frame and said support; and
   a slide member interconnected to the other of said frame and said support, wherein said slide member is sized for movement relative to said track member.

6. The hitch of claim 5, wherein said track member permits vertical movement of said slide member between first and second points.

7. The hitch of claim 5, wherein said track member further comprises at least one stop removeably attached to at least a first end of said track member, wherein said stop limits movement of said slide member relative to said track member.

8. The hitch of claim 1, further comprising:
   a second air spring having a first end fixedly connected to said support member and a second end fixedly connected to said hitch plate support member, wherein said first and second air springs support said frame relative to said support member free of other direct mechanical connection between said frame and said support member.

9. The hitch assembly of claim 8, wherein internal pressures of said first and second air springs are independently adjustable.

10. The hitch assembly of claim 1, wherein said support member comprises a box-shaped member having at least one substantially open side.

11. The hitch assembly of claim 10, wherein said first end of said air spring is fixedly connected to an inside surface of said box-shaped member.

12. The hitch assembly of claim 11, wherein said air spring at least partially supports said hitch plate support member relative to said open side of said box-shaped member.

13. A hitch assembly for connecting a tow vehicle to a trailer, comprising:
   a box-shaped support member having at least one substantially open end, said support member being interconnectable to a tow vehicle;
   a frame having first and second pivots for pivotally supporting a hitch plate that is adapted to connect a trailer to a tow vehicle, wherein said first and second pivots define a horizontal pivot axis, and wherein said horizontal pivot axis is transverse to a longitudinal axis of the tow vehicle; and
   a first air spring having a first end fixedly disposed within said box-shaped support member and a second end fixedly connected to said frame, wherein said first air spring supports said frame relative to said box-shaped support member free of other direct mechanical connection between said frame and said box-shaped support member.

14. The hitch assembly of claim 13, wherein said first end of said air spring is fixedly connected to an inside surface of said box-shaped member.

15. The hitch assembly of claim 13, wherein said box-shaped support member comprises at least first and second vertical sidewalls.

16. The hitch assembly of claim 15, further comprising:
a track member attached an inside surface of to one of said vertical sidewalls of said box-shaped support member; and
a slide member interconnected to the said frame, wherein said slide member is sized for receipt within said track member, wherein said slide member moves relative to said track member in a first direction when said air spring one of expands and compresses.

17. The hitch assembly of claim 16, wherein said track member permits vertical movement of said slide member between first and second points.

18. The hitch assembly of claim 17, wherein said track member further comprises at least one stop attached to at least a first end of said track member, wherein said stop limits movement of said slide member relative to said track member.

19. A hitch assembly for connecting a tow vehicle to a trailer, comprising:
a support member for fixed interconnection to a tow vehicle;
a frame having first and second pivots for pivotally supporting a hitch plate that is adapted to connect a trailer to a tow vehicle, wherein said first and second pivots define a horizontal pivot axis, and wherein said horizontal pivot axis is transverse to a longitudinal axis of the tow vehicle;
a first air spring having a first end fixedly connected to said support member and a second end fixedly connected to said frame, wherein said first air spring supports said frame relative to said support member free of other direct mechanical connection between said frame and said support member; and
a vertical track member attached to one of said frame and said support; and
a slide member interconnected to the other of said frame and said support, wherein said slide member is sized for receipt within and vertical movement within said vertical track member, wherein said vertical track member and slide member transmit towing forces between said support member and said frame.

20. The hitch of claim 19, wherein said slide member and track member permit vertical relative movement between said support member and said frame and at least partially restrict horizontal relative movement in at least one direction.

* * * * *